(12) United States Patent
Clement et al.

(10) Patent No.: US 9,690,374 B2
(45) Date of Patent: Jun. 27, 2017

(54) VIRTUAL/AUGMENTED REALITY TRANSITION SYSTEM AND METHOD

(71) Applicant: GOOGLE INC., Mountain View, CA (US)

(72) Inventors: Manuel Christian Clement, Mountain View, CA (US); Alexander James Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 14/696,716

(22) Filed: Apr. 27, 2015

(65) Prior Publication Data

US 2016/0313790 A1    Oct. 27, 2016

(51) Int. Cl.
    *G02B 27/01*     (2006.01)
    *G06F 3/01*      (2006.01)
    *G02B 27/00*     (2006.01)
    *G06T 19/00*     (2011.01)

(52) U.S. Cl.
    CPC .......... *G06F 3/011* (2013.01); *G02B 27/0093* (2013.01); *G02B 27/017* (2013.01); *G06F 3/012* (2013.01); *G02B 2027/014* (2013.01); *G02B 2027/0138* (2013.01); *G02B 2027/0178* (2013.01); *G02B 2027/0187* (2013.01); *G06F 2203/012* (2013.01); *G06T 19/006* (2013.01)

(58) Field of Classification Search
    CPC .......... G02B 27/017; G02B 2027/0138; G02B 2027/014; G02B 2027/0178; G02B 2027/0187; G02B 27/0093; G06F 3/011; G06F 3/012; G06F 2203/012; G06T 19/006
    See application file for complete search history.

(56) References Cited

U.S. PATENT DOCUMENTS

| 5,900,849 | A  |   | 5/1999  | Gallery |
|-----------|----|---|---------|---------|
| 6,278,418 | B1 | * | 8/2001  | Doi ........................ G09G 3/003 345/156 |
| 6,630,915 | B1 | * | 10/2003 | Flood ................... G02B 27/017 345/8 |
| 7,386,163 | B2 |   | 6/2008  | Sabe et al. |

(Continued)

OTHER PUBLICATIONS

International Search Report and Written Opinion for PCT Application No. PCT/US2016/023414, mailed May 30, 2016, 11 pages.

*Primary Examiner* — Michael J Eurice
(74) *Attorney, Agent, or Firm* — Brake Hughes Bellermann LLP

(57) ABSTRACT

A system and method of operating an audio visual system generating a virtual immersive experience may include an electronic user device in communication with a tracking device that may track a user's physical movement in a real world space and translate the tracked physical movement into corresponding movement in the virtual world generated by the user device. The system may detect when a user and the user device are approaching a boundary of a tracking area and automatically initiate a transition out of the virtual world and into the real world. A smooth, or graceful, transition between the virtual world and the real world as the user encounters this boundary may avoid disorientation which may occur as a user continues to move in the real world, while motion appears to have stopped upon reaching the tracking boundary.

21 Claims, 14 Drawing Sheets

(56) References Cited

U.S. PATENT DOCUMENTS

| | | |
|---|---|---|
| 7,965,295 B2 | 6/2011 | Herbrich et al. |
| 7,996,197 B1 | 8/2011 | Xavier et al. |
| 8,396,592 B2 | 3/2013 | Jones et al. |
| 8,515,578 B2 | 8/2013 | Chiappetta et al. |
| 2006/0197672 A1* | 9/2006 | Talamas, Jr. ......... A01K 15/023 340/573.3 |
| 2008/0297586 A1* | 12/2008 | Kurtz .................... H04N 7/147 348/14.08 |
| 2009/0144282 A1* | 6/2009 | Uramoto ............. G06F 21/6218 |
| 2011/0007277 A1* | 1/2011 | Solomon .............. G02B 26/105 353/7 |
| 2011/0211737 A1* | 9/2011 | Krupka ............. G06F 17/30265 382/118 |
| 2012/0197439 A1* | 8/2012 | Wang .................... B25J 9/1689 700/259 |
| 2013/0044130 A1* | 2/2013 | Geisner ................... G09G 5/00 345/633 |
| 2013/0083011 A1* | 4/2013 | Geisner ................... G09G 5/00 345/419 |
| 2013/0222369 A1* | 8/2013 | Huston ................... G06T 17/00 345/419 |
| 2013/0335301 A1* | 12/2013 | Wong ................. G02B 27/0093 345/8 |
| 2013/0336629 A1 | 12/2013 | Mulholland et al. |
| 2013/0346168 A1* | 12/2013 | Zhou ....................... G06F 1/163 705/14.4 |
| 2014/0330550 A1* | 11/2014 | Bill ........................ G06Q 10/10 704/2 |
| 2014/0361976 A1* | 12/2014 | Osman ............... G02B 27/0172 345/156 |
| 2015/0012426 A1* | 1/2015 | Purves ............... G06Q 30/0623 705/41 |
| 2015/0092015 A1* | 4/2015 | Stafford ............... H04N 13/025 348/46 |
| 2016/0026253 A1* | 1/2016 | Bradski ................ G02B 27/225 345/8 |
| 2016/0078641 A1* | 3/2016 | Aratani ..................... G06T 7/73 345/633 |
| 2016/0092726 A1* | 3/2016 | Li ...................... G06K 9/00355 345/156 |

\* cited by examiner

VIRTUAL/AUGMENTED REALITY TRANSITION SYSTEM AND METHOD

FIELD

This document relates, generally, to a virtual or augmented reality system.

BACKGROUND

In an immersive experience, such as an experience generated by a Virtual Reality (VR) system or an Augmented Reality (AR) system, a relatively clear boundary may exist between the immersive experience generated by the VR/AR system, or the "virtual" world, and the environment outside of the virtual world, or the "real" world. Accuracy when translating a user's real world position into the virtual world may enhance the user's sense of presence in the virtual world.

SUMMARY

In one aspect, a method of operating an audio visual system configured to generate a virtual immersive experience may include activating a tracking device and tracking a position of a user electronic device in a real world space, detecting a transition condition, and performing a transition process to transition out of the virtual world generated by the user electronic device in response to the transition condition.

In another aspect, a method of operating an audio visual system configured to generate a virtual immersive experience may include activating a tracking device having a defined tracking area and tracking movement of a user electronic device the real world space, translating the real world movement of the user electronic device in the real world space into virtual movement in a virtual world generated by the user electronic device, determining when a current position of the user electronic device is within a threshold of a system boundary, and performing a transition process when the current position of the user electronic device is within the threshold of the system boundary.

In another aspect, an audio visual system may include a user electronic device generating a virtual world experience, the user electronic device being movable within the real world space, a tracking device in communication with the user electronic device, the tracking device tracking a position of the user electronic device in the real world space and real world movement of the user electronic device in the real world space, and a processor. The processor may translate the detected real world movement of the user electronic device into virtual movement in the virtual world generated by the user electronic device, may automatically perform a transition out of the virtual world generated by the user electronic device when a distance between the tracking device in the tracking area and a boundary of the tracking area is less than or equal to a preset threshold distance such that the transition out of the virtual world is complete at or before the user electronic device reaches the boundary, and may perform a transition back into the virtual world by the user electronic device when the tracking device detects that the user electronic device has crossed the boundary and re-entered the tracking area.

The details of one or more implementations are set forth in the accompanying drawings and the description below. Other features will be apparent from the description and drawings, and from the claims.

DETAILED DESCRIPTION

A Virtual Reality (VR) system and/or an Augmented Reality (AR) system may include, for example, a head mounted display device (HMD) or similar device worn by a user, for example, on a head of the user, to generate an immersive VR environment to be experienced by the user. Movement of the user in the real world may be translated into corresponding movement in the environment generated in the virtual world. Differences in the physical boundaries of the real world, such as, for example, the confines of a room and/or objects in the room, and boundaries of the virtual world may cause discrepancies or disruptions in the immersive experience and disorientation as the user approaches and/or encounters one of these virtual boundaries and/or one of these physical boundaries. A smooth, or graceful, transition, for example, from the virtual world to the real world as the user encounters a boundary of the virtual world, may avoid the disorientation and motion sickness which may occur as a user continues to move in the real world, while motion appears to have stopped upon reaching the boundary of the virtual world.

Figure 1A:
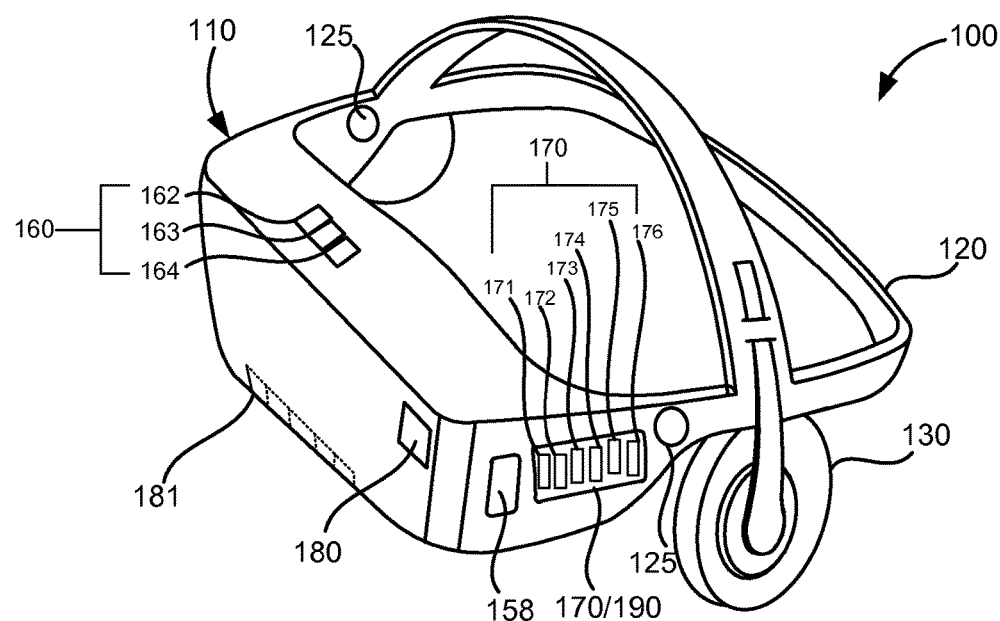
FIGS. 1A and 1B are perspective views and FIG. 1C is a side view of a head mounted display device, in accordance with an embodiment broadly described herein.
Figure 1B:
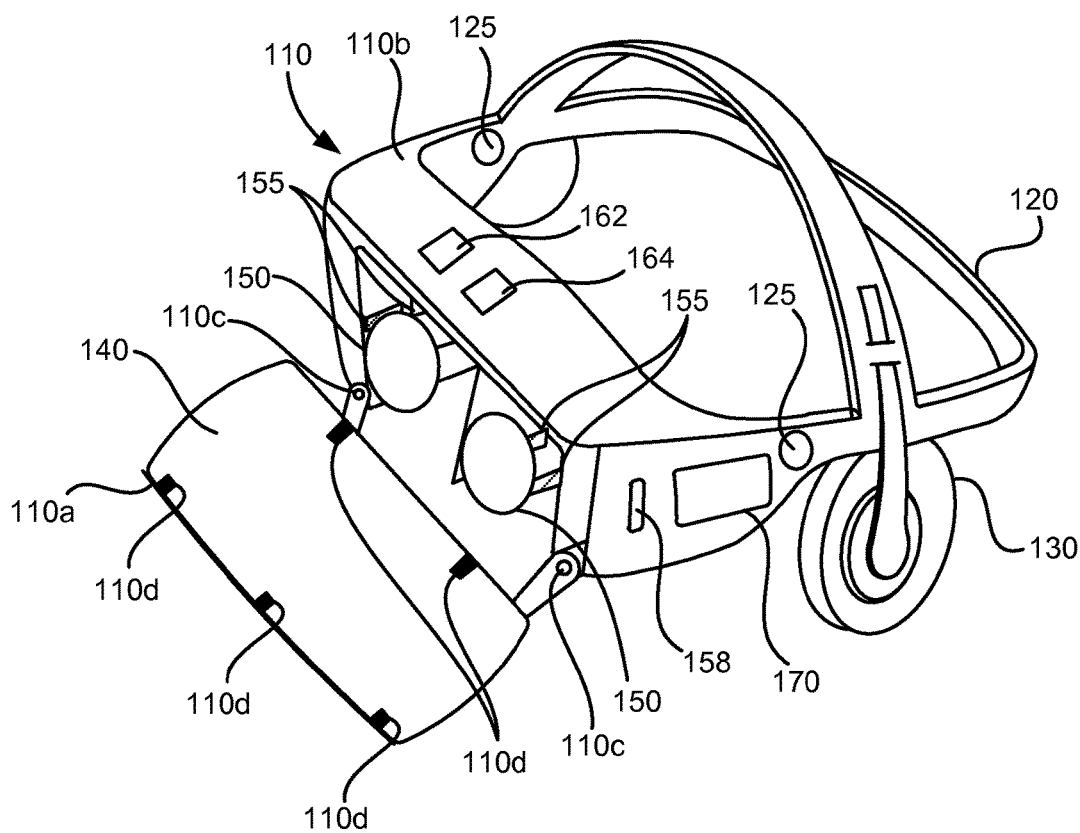
Figure 1C:
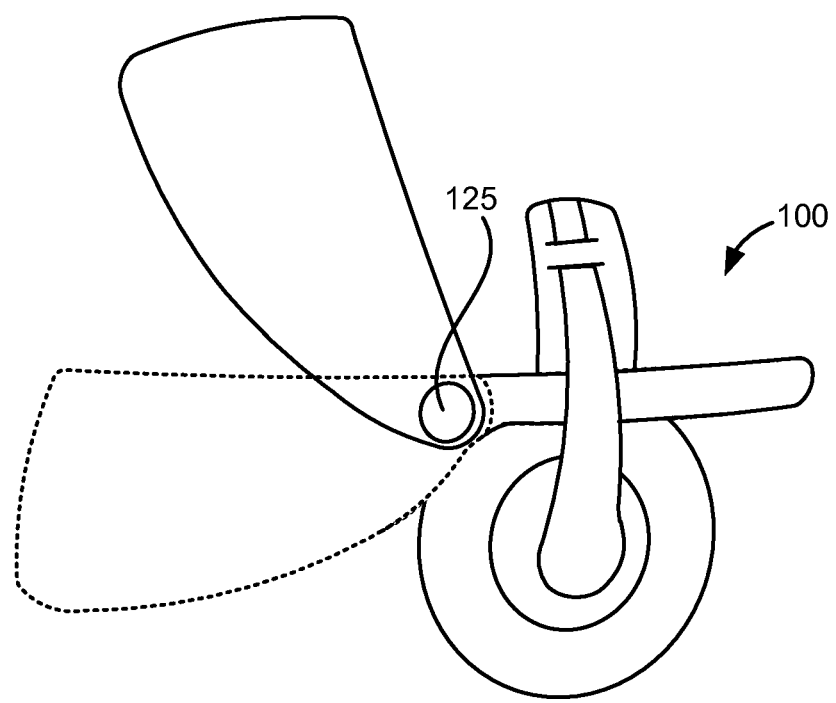

FIGS. 1A and 1B are perspective views and FIG. 1C is a side view of an example HMD which may be worn by a user to generate an immersive virtual experience. The example HMD 100 may include a housing 110 in which optical components may be received. The housing 110 may be coupled, for example, rotatably coupled and/or removably attachable, to a frame 120 which allows the housing 110 to be mounted or worn on a user's head. An audio output device 130 may also coupled to the frame 120, and may include, for example, speakers mounted in headphones and coupled on the frame 120.

As shown in FIG. 1B, a front face 110a of the housing 110 rotated away from or otherwise removably attached to a base portion 110b of the housing 110. A display 140, such as, for example, a smartphone or other display device, may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be adjusted by an adjustment device 158, so that the lenses 150 may be aligned with respective optical axes of the user's eyes to provide a relatively wide field of view and relatively short focal length.

The HMD 100 may also include a sensing system 160 including various sensing system devices 162-164 and a control system 170 including various control system devices 171-176 to facilitate manual user control and automated control of the HMD 100. The control system 170 may also include a processor 190 to control operation of the components of the control system 170, both when operated manually and independently, and also when operated in response to conditions detected/sensed by the sensing system 160 in response to a command received by the control system 170.

In some embodiments, the HMD 100 may also include a camera 180 which may capture still and moving images of the real world environment and display these images to the user on the display 140 in a pass through mode. In the pass through mode, the user may be able to leave the virtual world and temporarily return to the real world without removing the HMD 100 or otherwise changing the configuration of the HMD 100 such as, for example, moving the housing 110 out of the line of sight of the user. In some embodiments, the display 140 may be a transparent display, allowing the user to view the real world environment through the display 140 in some modes of operation.

Figure 2:
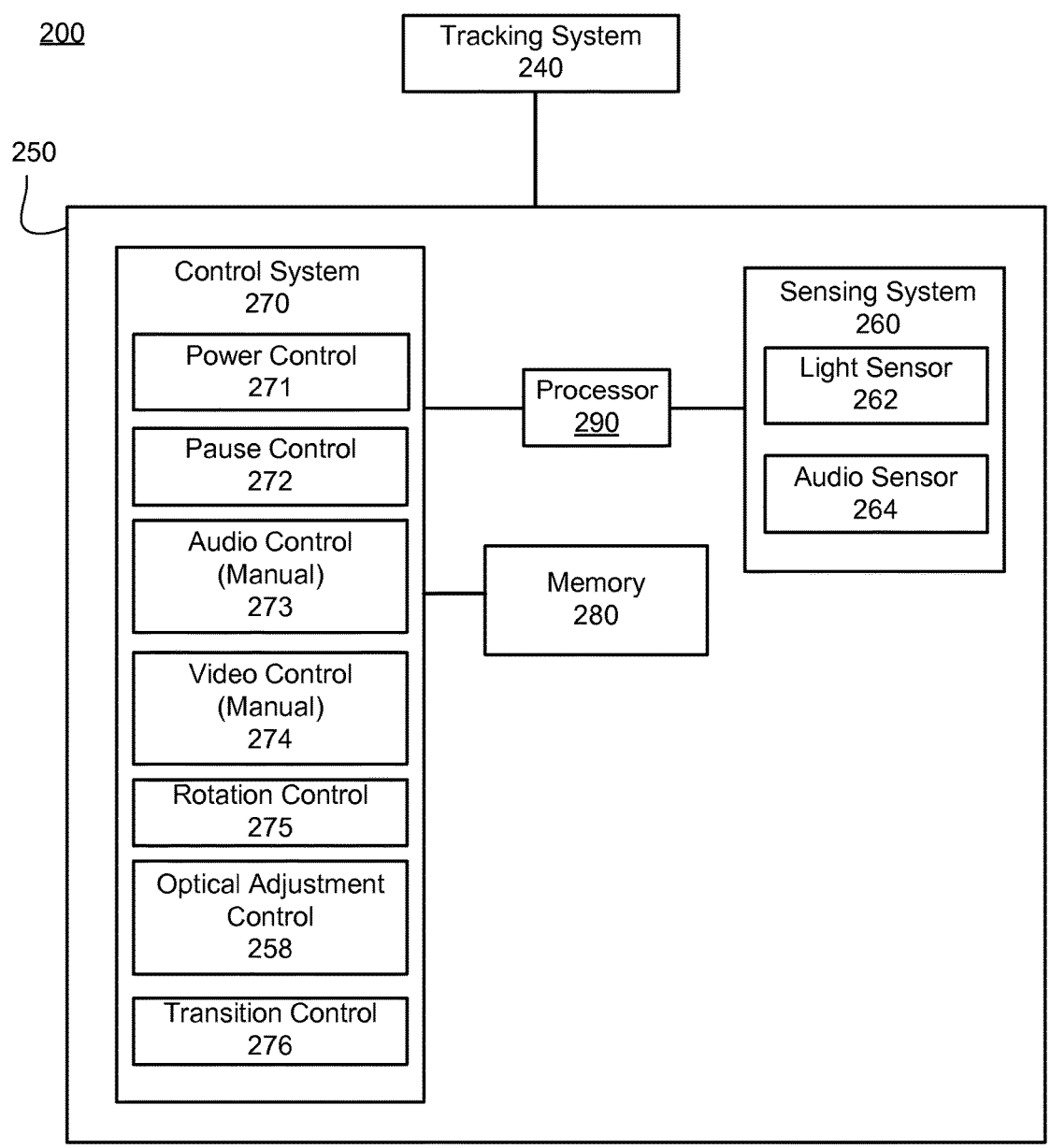
FIG. 2 is a block diagram of the head mounted display device, in accordance with an embodiment broadly described herein.

A block diagram of a system 200 for transitioning from a virtual/augmented reality environment to an ambient environment in shown in FIG. 2. The system 200 may include a user electronic device 250, such as, for example an HMD as described above with respect to FIGS. 1A-1C, to generate the virtual reality environment, in communication with a tracking system 240 that tracks a user position in a real world, physical space, so that the user's physical movement in the real world space may be translated into movement in the virtual reality world by the system 200. The device 250 may include a sensing system 260 and a control system 270, which may be similar to the sensing system 160 and the control system 170, respectively, shown in FIGS. 1A-1C. In the example embodiment shown in FIG. 2, the sensing system 260 includes a light sensor 262, a distance/proximity sensor 263 and an audio sensor 264, and the control system 270 includes a power control device 271, a pause control device 272, a manual audio control device 273, a manual video control device 274, a rotation control device 275 to control rotation of the housing relative to the frame, an optical adjustment control device 258 to adjust optical components of the device 250, and a transition control device 276 to control transitions between the virtual environment and the ambient environment. In some embodiments, the sensing system 260 and/or the control system 270 may include more, or fewer, devices, depending on a particular implementation. The elements included in the sensing system 260 and/or the control system 270 can have a different physical arrangement (e.g., different physical location) within, for example, an HMD other than the HMD 100 shown in FIGS. 1A-1C.

In a VR system, a user may physically move in a prescribed physical space in which the system is received and operated. The system may track the user's movement in the physical space, or the "real" world, and cause the virtual world to "move" in coordination with the user's movement in the real world. This positional tracking may thus track a position of a user in the real world and translate that movement into the virtual world to generate a heightened sense of presence in the virtual world.

In some embodiments, this type of motion tracking in the space may be accomplished by, for example, a tracking device such as a camera positioned in the space, and in communication with a base station generating the virtual world in which the user is immersed. This base station may be, for example, a standalone computing device, or a computing device included in the HMD worn by the user. In the example implementation shown in FIG. 3A, a tracking device 310, such as, for example, a camera 310, is positioned in a physical, real world space 300, and is oriented to capture as large a portion of the space 300 as possible with its field of view. This tracking area 320 defined by, for example, the field of view and range of the tracking device 310, is represented by the shaded portion of the space 300 shown in the example illustrated in FIG. 3A. In this example, the tracking area 320 of the tracking device 310 is smaller than the real world space 300 in which the system is received. As a user A, immersed in the virtual world, moves through the real world space 300, a position of the user A in the space 300 may be tracked by the tracking device 310 and translated into a position/movement in the virtual world, provided the user A remains within the field of view, or tracking area 320, of the tracking device 310. Because in this example the tracking area 320 is smaller than the real world space 300, it is possible for the user A to move out of the tracking area 320 and still be in the space 300. If the user A moves out of the tracking area 320, or for some other reason cannot be "seen" by the tracking device 310 (such as, for example, being blocked by an obstacle), then continued movement of the user A in the real world space 3200 will not be translated into corresponding movement in the virtual world. Rather, after tracking is lost, while the user A continues to move in the real world space 300, the virtual world will remain still, or appear to be stuck.

Figure 3A:
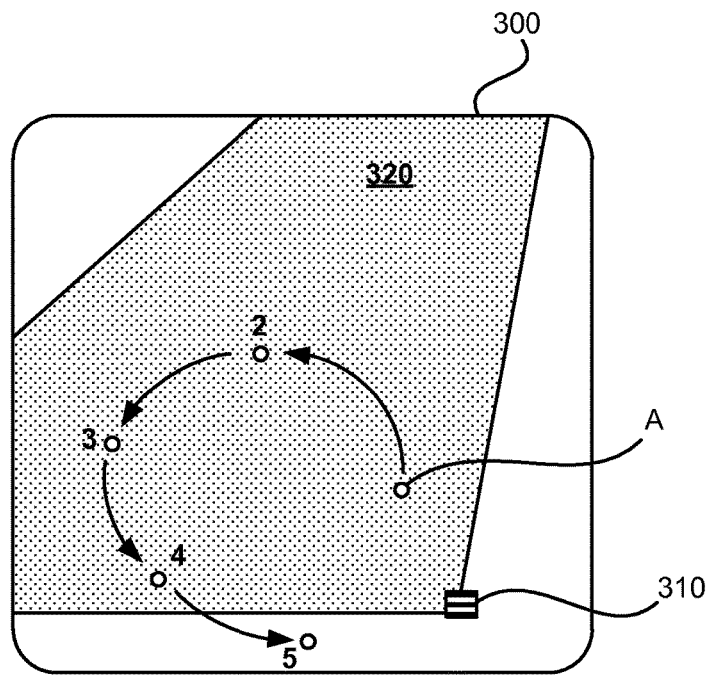
FIGS. 3A-3C illustrate an example implementation of a system for automatically transitioning into and out of an immersive experience, in accordance with an embodiment broadly described herein.

As shown in FIG. 3A, the user A, immersed in the virtual world, may move in the real world space 300, for example, sequentially from position 1 to position 5. At positions 1, 2 and 3, the user A is completely within the field of view, or tracking area 320, of the tracking device 310. At position 3, the user A is within the tracking area 320, but close to a boundary of the real world space 300, such as, for example, a wall. At position 4, the user A is just within the tracking area 320, very close to a boundary of the tracking area 320. At position 5, the user has crossed the boundary of the tracking area 320 and has moved completely out of the field of view, or tracking area 320 of the tracking device 310.

At positions 1, 2 and 3 shown in FIG. 3A, because the user A is within the tracking area 320, movement of the user A in the real world space 300 tracked by the tracking device 310 may be translated into corresponding movement in the virtual world. At position 4, the tracking device 310 may still track movement of the user A in the real world space 300 and translate that tracked real world movement into movement in the virtual world. However, due to the user's proximity to the edge of the tracking area 320, or the point at which the tracking device 310 can no longer track the movement of the user A, it may be considered that, at position 4 the user A is about to exceed a predetermined threshold at which loss of tracking may be near, or imminent, as at position 5. That is, as discussed above, if the user A continues to move in the room 300 after tracking of the user A by the tracking device 310 is lost, the virtual world may remain still, or appear stuck, while the user A continues to move, which may cause disorientation, motion sickness, dissatisfaction with the virtual immersive experience and the like. A fluid, or graceful, transition from the virtual world to the real world, before actually reaching this still or stuck point in the virtual world, may alleviate the negative effects of disorientation, motion sickness and the like.

Figure 3B:
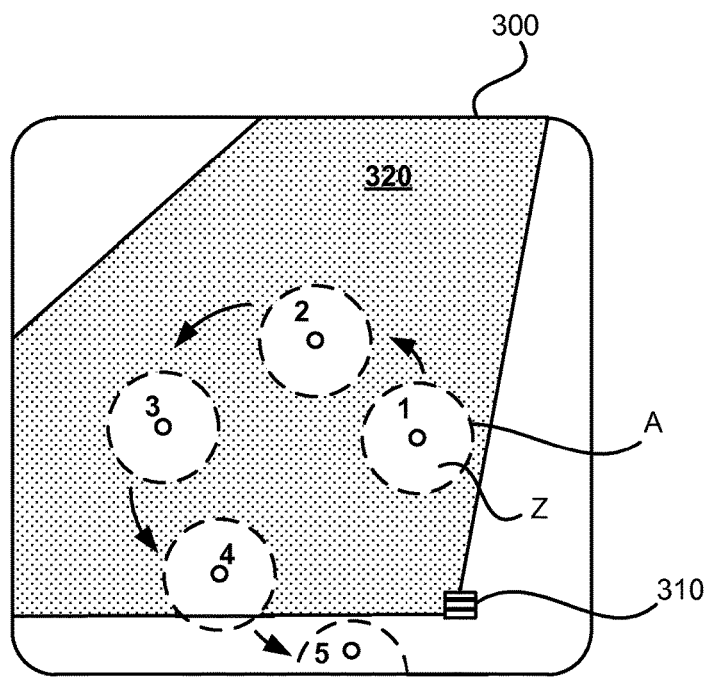

In the example shown in FIG. 3B, a theoretical zone Z surrounding the user A is denoted by dotted lines surrounding the user A at each of the positions 1 through 5. Although the example zone Z shown in FIG. 3B is essentially circular, surrounding the user A, simply for ease of discussion and illustration, the zone Z may have other shapes and/or extend across a different area relative to the user A. For example, the zone Z may be defined by an area extending mostly in front of the user A as the user moves in a particular direction. Regardless of the shape or contour of this zone Z, the zone Z may represent, for example, a warning threshold or boundary associated with the position of the user A in the space 300 relative to the tracking area 320 of the tracking device 310. At positions 1, 2 and 3, the user A and the zone Z surrounding the user A are completely within the tracking area 320, and physical movement of the user A in the space 300 may be translated to corresponding movement in the virtual world as described above. At position 4, the user A is within the tracking area 320, but in close proximity to the edge or boundary of the tracking area 320, with a portion of the zone Z surrounding the user A outside of the tracking area 320. At position 5, the user A and the zone Z surrounding the user A are completely outside of the tracking area 320.

As noted above, while at position 4, the tracking device 310 may still track movement of the user A in the space 300 and translate the tracked physical movement into movement in the virtual world. However, the user's proximity to the edge of the tracking area 320, and the movement of a portion of the zone Z close to, or beyond, the boundary of the tracking area 320, may trigger the initiation of a fluid, or graceful, transition process from the virtual world to the real world before tracking is fully lost and real world physical movement can no longer be translated into movement in the virtual world. This may avoid the discomfort and disorientation that may be associated with a more abrupt end to the virtual world as the user A continues to move in the real world.

In some embodiments, the tracking device 310 may not just track the physical position and movement of the user A in the space 300, but may also detect when the user A is within a predetermined distance, or threshold, of a boundary or edge of the tracking area 320, at which loss of tracking may be imminent. As shown in the example illustrated in FIG. 3B, this loss of tracking by the tracking device 310 may be considered imminent when, for example, the zone Z approaches the boundary of the tracking area 320, in advance of when the user actually moves into an area of the space 300 which cannot be tracked by the tracking device 310. For example, the system may issue a warning or indicator, and/or may automatically initiate a fluid or graceful transition out of the virtual world when the user is at position 4, even though the user is still in the tracking area 320 at position 4, so that by the time the user reaches position 5, the transition out of the virtual world will be complete, and the user may avoid disorientation and/or discomfort due to the loss of tracking.

In some embodiments, the zone Z at which the transition process is initiated may be set based on one or more different factors such as, for example, size/dimensions of the space 300, a type of virtual immersive experience generated by the HMD 100, an amount and/or speed of movement of the user in the space 300, a position of the tracking device 310, user preferences, and other such factors. In the example implementation shown in FIG. 3B, if dimensions of the space 300 were, for example, 12 feet by 12 feet, with the tracking area 320 denoted by the shaded portion of the space 300 in FIG. 3B, and the zone Z at which the transition process is initiated were set at, for example, a 3 foot radius surrounding the user, based on various different factors as described above, then the gradual transition out of the virtual world may be carried out as shown in FIG. 3C.

Figure 3C:
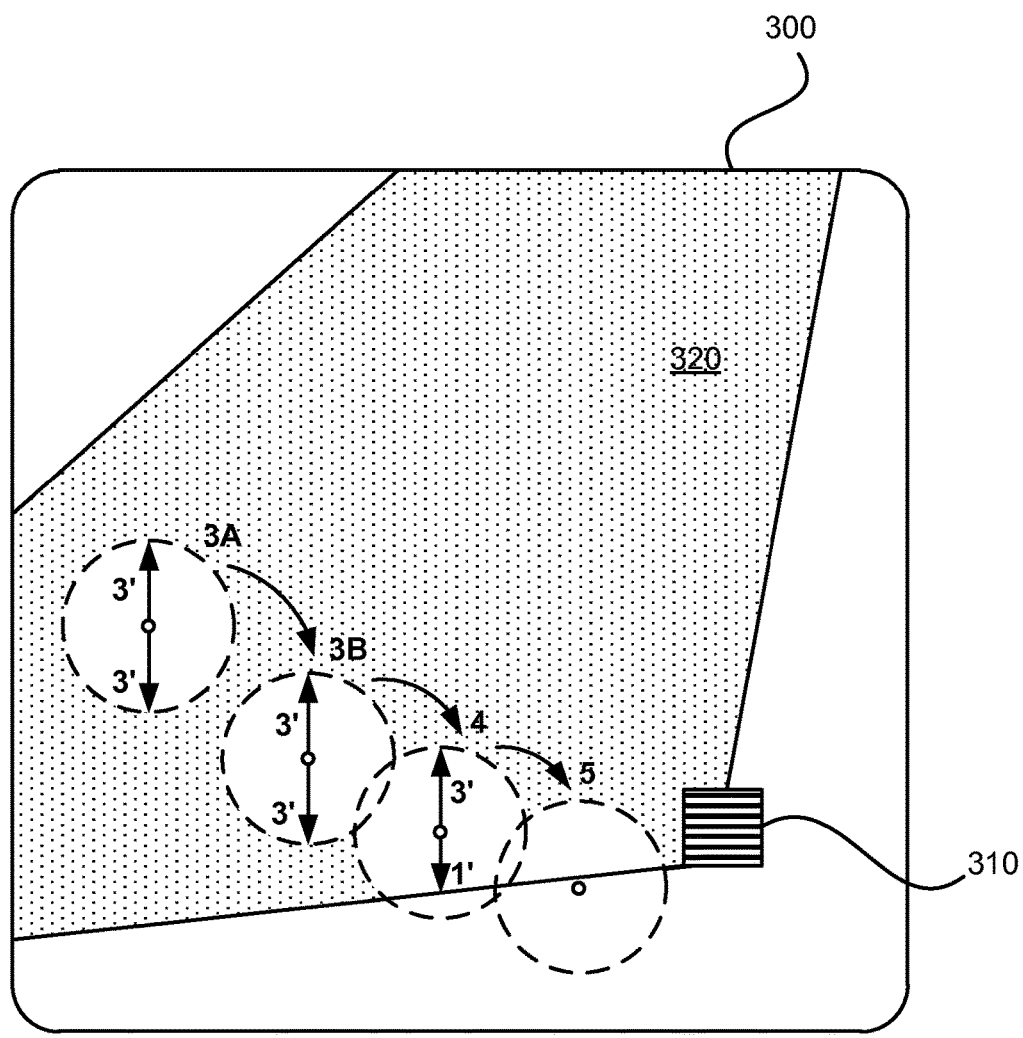

As shown in FIG. 3C, the user is completely within the tracking area 320 at position 3A. As the user moves from position 3A to position 3B, the user approaches the point at position 3B at which the edge of the established 3 foot radial zone meets the boundary of the tracking area 320. As the HMD 100 and/or the tracking device 310, or other component of the system, determines that the user is positioned within the preset threshold (in this particular example, 3 feet of the boundary of the tracking area 320, as at position 3B), the system 100 may initiate a gradual transition out of the virtual world. At position 4, the user has moved closer to the boundary of the tracking area 320 (for example, within 1 foot of the boundary as shown in the example illustrated in FIG. 3C). At position 4, the transition out of the virtual world may be at least partially complete, with the transition process fully complete by the time the user reaches position 5 and is fully outside of the tracking area 320.

The transition process, to transition the user from a fully immersed virtual reality state at position 3A to a real world state at position 5, may follow a variety of different profiles. Transition profiles may be consistent with, for example, the type of immersive virtual experience generated by the HMD 100, the speed and/or direction the user is moving in the space 300, preset user preferences, and other such factors. In the example implementation shown in FIG. 3C, simply for ease of discussion and illustration, if a linear transition profile is assumed, the transition process may be initiated at position 3B, when the user is 3 feet from the boundary (the preset zone in this example), and may be ⅔ complete when the user is positioned 1 foot from the boundary at position 4. In some embodiments, an indicator may signal initiation of the transition process. The indicator may include, for example, a visual indicator, an audible indicator, a physical indicator such as, for example, buzz or vibration generated by the HMD 100 and the like.

This example of a linear progression of the transition from the virtual world to the real world is just one example of how the transition between the virtual world and the real world may be accomplished. In some embodiments, the transition between the virtual world and the real world may follow, for example, a non-linear profile, a stepped profile, or other profile based on various different factors as noted above. In some embodiments, the system may automatically adjust the transition profile, such as, for example, selecting a different transition profile and/or adjusting an acceleration rate of the profile, based on, for example, changes in speed at which the user is approaching the boundary, changes in direction of the user, and other such factors.

In some embodiments, the tracking device 310 may detect the user's proximity to a boundary of the tracking area 320, or that the user is within a threshold distance of a boundary of the tracking area 320. In some embodiments, the HMD 100 may include a sensor that detects that the user user's proximity to a boundary of the tracking area 320, or that the user is within a threshold distance of a boundary of the tracking area 320. For example, one of the sensors of the sensing system 160 (such as, for example a proximity sensor 163) and/or the camera 180 of the HMD 100 may detect this proximity to the boundary, and the control system 170/processor 190 may initiate the transition process as described above.

In the example implementation shown in FIGS. 3A-3C, the tracking area 320 is smaller than the space 300 in which the system is operated, resulting in areas in the space 300 which are outside of the field of view of the tracking device 310, and thus user movement in those areas cannot be tracked. In some embodiments, the tracking area 320 of the tracking device 310 may be the same as, or greater than, the size of the space 300 itself, based on, for example, dimensions of the space 300, capabilities of the tracking device 310, installation position of the tracking device 310 in the space 300, and the like.

Figure 4:
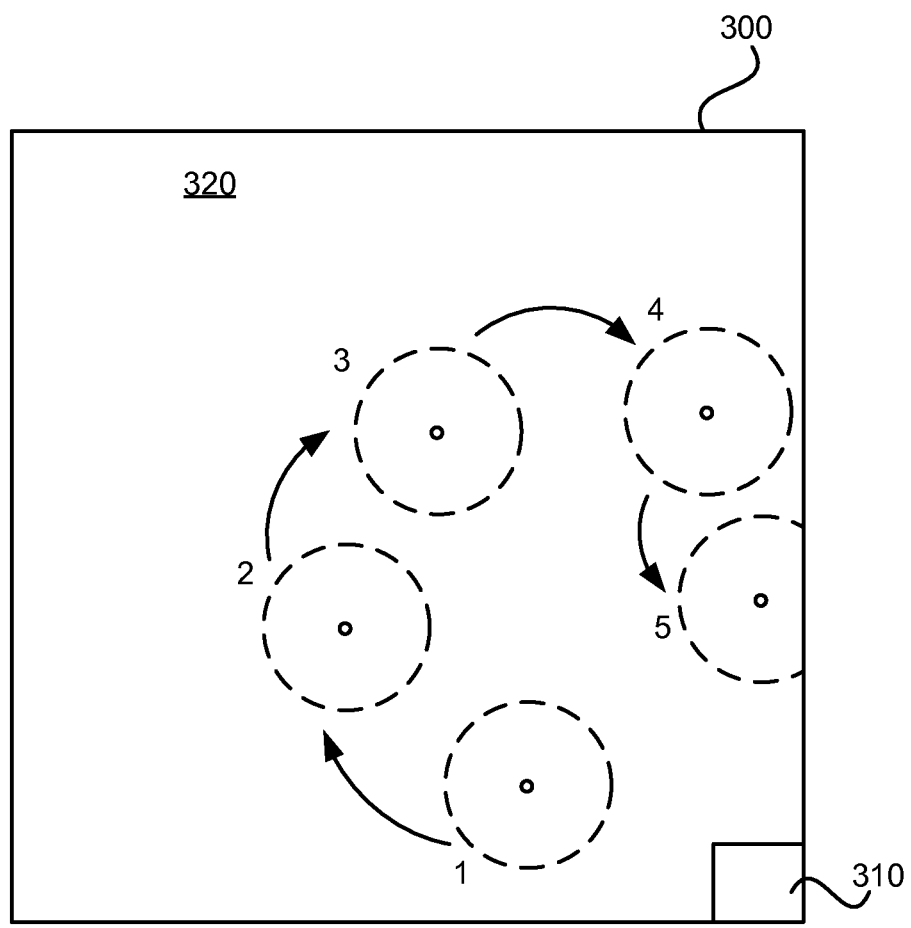
FIG. 4 illustrates another example implementation of a system for automatically transitioning into and out of an immersive experience, in accordance with an embodiment as broadly described herein.

In the example implementation shown in FIG. 4, the tracking device 310 can capture substantially the entirety of the real world space 300 in its field of view, or tracking zone 320. In this example, tracking of the user is not lost due to the user leaving the tracking zone 320, and, as the user moves from sequentially from position 1 to position 5, the tracking device 310 may track the physical movement of the user in the space 300 and that physical movement may be translated into corresponding movement in the virtual world. To avoid obstacles in the room which may, for example, pose a hazard to the user, a gradual transition out of the virtual world may be performed, as described above, as the user approaches an obstacle. In the example shown in FIG. 4, the user is within the predetermined threshold, or zone, approaching a wall of the space 300 at position 4. Thus, at position 4, the system may initiate a gradual transition out of the virtual world experience, so that, by the time the user reaches position 5, the transition out of the virtual world is complete and the user may avoid collision with the wall. A similar approach may be applied to other detecting and avoiding other obstacles, such as, for example, tables, chairs, stairs and the like, present in the space 300. In some embodiments, the configuration of the space 300, such as, for example, the dimensions and any furniture and the like in the room may be previously known and stored by the system. In some embodiments, the system may scan and store a configuration of the space 300 prior to initiation of a VR experience.

Figure 5A:
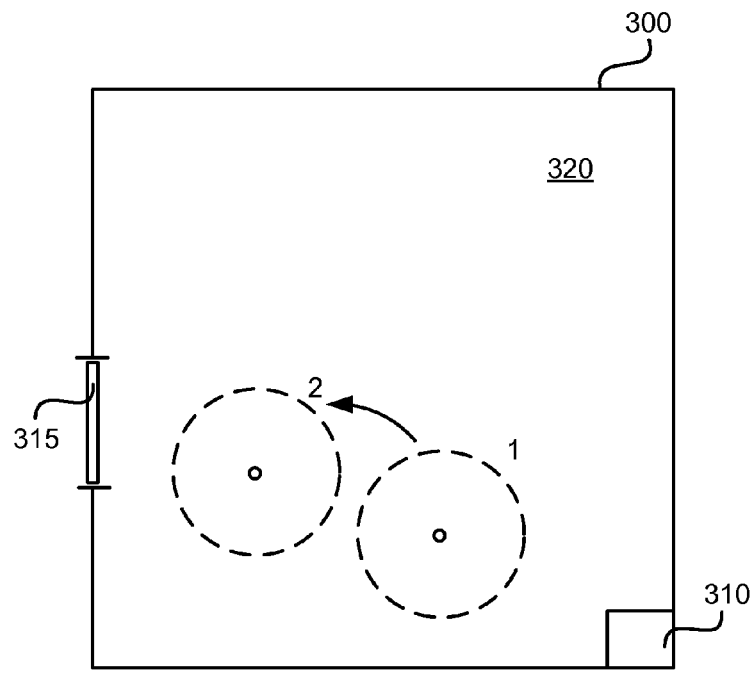
FIGS. 5A and 5B illustrate another example implementation of a system for automatically transitioning into and out of an immersive experience, in accordance with an embodiment as broadly described herein.
Figure 5B:
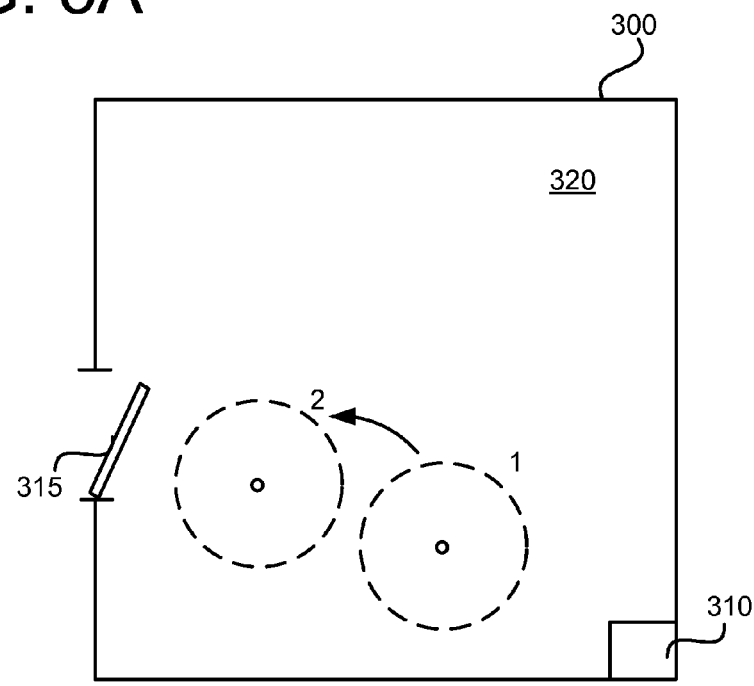

For example, in some embodiments, the tracking device 310 may be configured to scan and collect images of the space 300 to essentially paint, or construct, an image of the space 300. This scanning may be done once, for example, upon initiation of a session, or may be periodically or substantially continuously updated. In the example implementation shown in FIG. 5A, the tracking device 310 tracks the user in the space 300 as the user moves from position 1 to position 2. In an implementation in which the tracking device 310 is configured to intermittently scan and re-paint the space 300, in addition to tracking the user, the tracking device 310 may detect, for example, other objects in the space 300 which may pose an obstacle to the user, or may detect changes in the space 300 such as, for example, a door 315 moving from the closed position shown in FIG. 5A to the open position shown in FIG. 5B. As the open door 315 shown in FIG. 5B may pose an obstacle, or a hazard, to the user, the system may generate a warning indicator, and/or may initiate the transition process upon detection of the obstacle, so that the obstacle is visible to the user and/or the user is aware of the obstacle.

As noted above, in some embodiments the system may generate a warning indicator and/or initiate the transition process upon detection of obstacles, i.e., stationary obstacles, already present in the room, such as, for example, furniture and the like. The warning indicator may include, for example, a visual indicator and/or an audible indicator and/or a physical indicator such as, for example a buzz or vibration of the HMD 100. The system may also generate a warning indicator and/or initiate the transition process upon detection of new obstacles detected as the tracking device 310 scans and updates the configuration of the space 300, such as, for example the opening of the door 315 shown in FIG. 5B. In some embodiments, the system may also generate a warning indicator and/or initiate the transition process in a situation in which, for example, another person approaches the user. This may be implemented to avoid collision between multiple players in a scenario in which multiple players or users are in the same space 300, engaged in a virtual reality immersive experience, in a situation in which another person requires the attention of the user, and other such circumstances. As noted above, the rate at which the warning indicator and/or the transition process is initiated and carried out, may be based on numerous different factors, including, for example, the nature of the virtual reality immersive experience, the speed and/or direction of the user(s) in the space 300, and the like.

In some embodiments, the transition between the virtual world and the real world may be initiated, for example, as the user approaches the boundary of the tracking zone 320, or when an obstacle is detected in the path of the user, when another user engaged in the VR experience is in the path of the user, when another person requires the attention of the user, and other such situations as discussed above in more detail. In some embodiments, when transitioning from the virtual world to the real world, the transition may include a gradual fade of the image displayed on the display 140 of the HMD 100. The gradual fade may include a gradual fade from the image associated with the virtual world to, for example, a monochromatic display, such as, for example, an all white screen, or an all black screen and the like. In some embodiments, the transition may include the display of pass through images of the real world environment on the display 140, captured by, for example, the camera 180 on the HMD 100. In some embodiments, these pass through images may be, for example, superimposed on, or ghosted on, the virtual reality images displayed on the display 140. In some embodiments, the display 140 of the HMD 100 may be a transparent display, allowing the real world environment to be viewed through the display 140 after the virtual images are no longer displayed.

In some embodiments, the fade out of the virtual images displayed on the display 140 of the HMD 100 and the fade in of, for example, the monochromatic display, or the images of the real world captured by the camera 180 and passed to the display 140, or the visibility of the real world afforded by a transparent display, may be carried out in a symmetric fashion, so that as the images of the virtual world fades, the virtual images are replaced by images of the real world at a corresponding rate. In some embodiments, the fade out of the virtual images and the fade in of, for example, the monochromatic display, or the images of the real world captured by the camera 180 and passed to the display 140, or the visibility of the real world afforded by a transparent display, may be carried out in an asymmetric fashion.

In some embodiments, the rate at which the transition is performed may be dynamically adjusted based on, for example, the type virtual immersive experience generated by the HMD 100, the speed and/or direction of the user, the speed, direction and/or proximity of other user(s), environmental differences between the virtual world and the real world (such as, for example, differences in brightness levels, differences in sound levels), user preferences and the like.

In some embodiments, the transition may include a pause in movement or an action sequence in the virtual world, or a change in color (for example, from full color to black and white), prior to proceeding into the fade, to serve as an indicator that a transition is to occur.

In some embodiments, the transition may include a fade of sound content. For example, when transitioning from the virtual world to the real world, audio content associated with the virtual world may fade out, accompanied by a fade in of ambient sound. In some embodiments, the fade out of virtual audio content and the fade in of ambient sound may accompany the fade out of virtual images and the fade in of real world images. In some embodiments, the fade out of virtual audio content and the fade in of ambient sound may be accomplished serially, so that the ambient sound is not superimposed on, or output at the same time as, the virtual audio content.

In some embodiments, the system may be configured to simulate other environmental factors associated with the virtual world, such as, for example, temperature, smell and the like. When so configured, the system may also gradually transition these other environmental factors from the virtual world to those of the ambient environment in a similar manner.

In some embodiments, the system may be configured to detect when the user re-enters the tracking zone 320, or has moved away from an obstacle, or two users in the same space 300 are no longer on a path to collision, and may perform a transition from the real world back into the virtual world in a manner similar to the process described above with respect to transitioning from the virtual world into the real world. That is, in some embodiments, the transition from the real world back into the virtual world may include a fade out of the real world images displayed on the display and a fade in of the virtual world images, in a symmetric or an asymmetric manner, In some embodiments, the transition from the real world back into the virtual world may include a ghosting of the virtual world images onto the real world images as the real world images fade out and are replaced by the virtual world images. In some embodiments, the transition from the real world back into the virtual world may include an indicator prior to initiating the transition, such as, for example, a visual indicator and/or an audible indicator and/or a physical indicator. In some embodiments, this transition back into the virtual world may allow the user to resume activity in the virtual world at a point at which the transition from the virtual world to the real world was initiated, to avoid loss of content and functionality.

As noted above, in some embodiments, the transition process may be initiated in response to another person, or external party, approaching the user, or otherwise attempting to gain the attention of the user who is immersed in the virtual experience generated by the HMD 100. For example, the HMD 100 may recognize a gesture implemented by the external party as a request to gain the attention of the user. This type of gesture may be, for example, a hand wave or other such gesture captured by camera 180 and recognized by the HMD 100 as a request to gain the attention of the user. In some embodiments, the HMD 100 may recognize the approach of the external party, such as, for example, another person not engaged in the virtual immersive experience, as a request to gain the attention of the user. In some embodiments, the HMD 100 may recognize particular key words or sounds as a request to gain the attention of the user. The HMD 100 may initiate the transition process in response to a recognizing a request to gain the attention of the user.

In some embodiments, when the transition process is initiated in response to a request from another person, or external party, to gain the attention of the user, the HMD 100 may generate an external indicator to confirm to the external party that transition is in process, or has been completed, and that the user is disengaged from the virtual world and available for interaction with the external party, in the real world. In some embodiments, this external indicator to the external party may be generated by the HMD 100, and may be, for example, a visual indicator, an audible indicator, a physical indicator such as a movement of the HMD 100, and various combinations of these types of indicators.

In some embodiments, this external indicator may include, for example, a change in a physical appearance in some portion of the HMD 100 that may be visible by the external party. This physical change in appearance may include, for example, illumination of an indicator light on the HMD 100, such as, for example, illumination of one or more of the control system devices 171-176 of the control system 170, or illumination of one or more indicator lights 181 (see FIG. 1A) provided on the HMD 100. In some embodiments, this physical change may include, for example, a change in appearance of certain portions of the HMD 100. A change in appearance of the HMD 100 may include, for example, a change in color of certain portions of the housing 110 and/or frame 120 of the HMD 100 achieved by, for example, one or more light sources provided in and/or on the HMD 100, such as illumination of a sequence of light emitting diodes which can change illumination color, flash and the like.

Figure 6A:
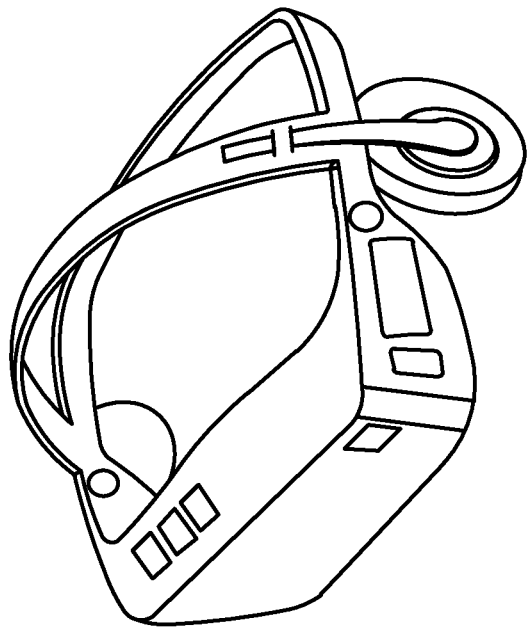
FIGS. 6A and 6B illustrates example implementations of external indicators generated by the example head mounted display shown in FIGS. 1A-1C, in accordance with embodiments as broadly described herein.
Figure 6A:
Figure 6A:
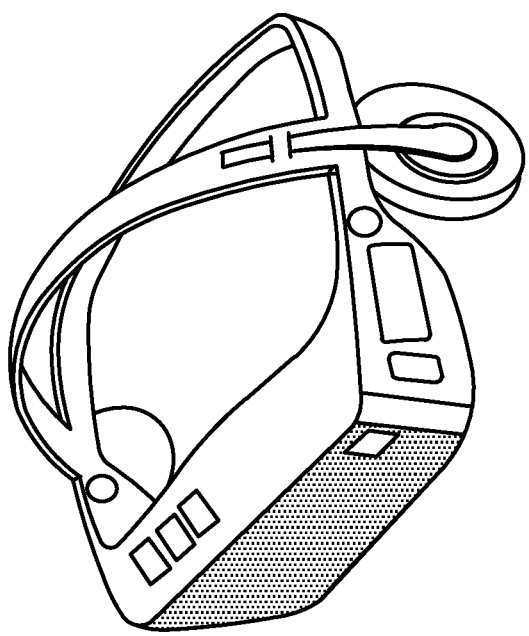

In some embodiments, portions of the housing 110 and/or frame 120 of the HMD 100 may be made of a material that can transition between an opaque state and a transparent state, such as, for example, a polymer dispersed liquid crystal (PDLC) material. When powered off, this type of material may be opaque. When activated by light, liquid crystal droplets dispersed in the material may transmit through the material, causing the material to transition from an opaque state to a clear, or transparent state as shown in FIG. 6A. A portion of the housing 110 and/or the frame 120 of the HMD 100 made of this type of material may affect a change in the physical appearance of the HMD 100 which may be visible to the external party as an indicator that the user is disengaged from the virtual world and available for interaction in the real world.

Figure 6B:
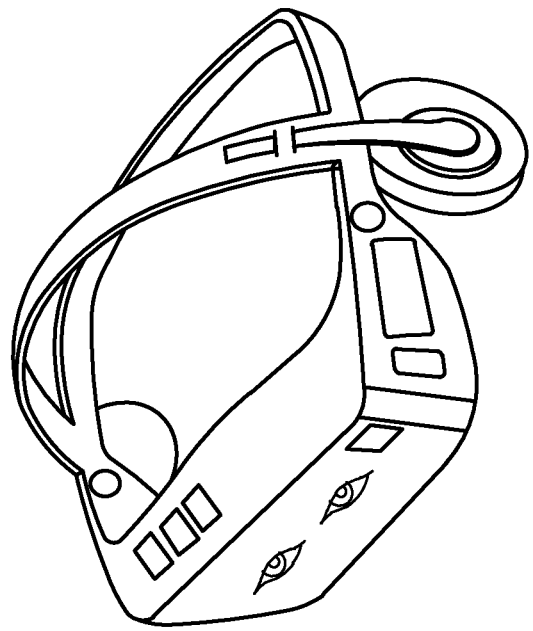
Figure 6B:
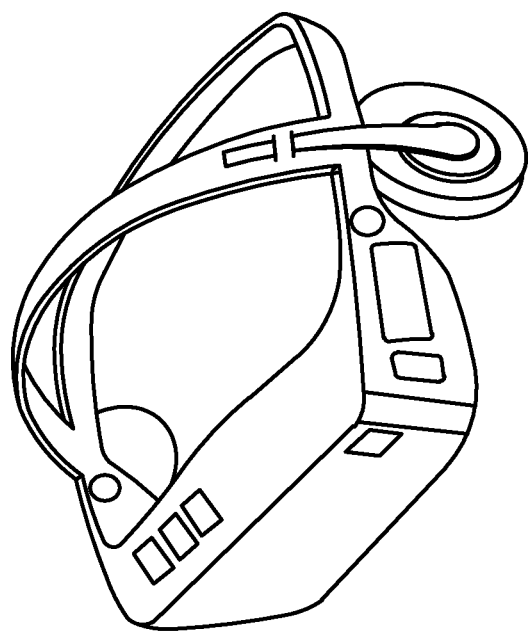

In some embodiments, a change in physical appearance of the HMD 100 visible to the external party may include, for example, a change in appearance of an externally visible side of the display 140, as shown in FIG. 6B. For example, in some embodiments, the display 140 may be a smartphone removably coupled in the housing 110, or other electronic device including a display surface visible to the user from an internal facing side of the device, and a display surface visible to the external party from an external facing side of the device. In this type of arrangement, an image may be displayed on the external facing side of the device, which may be visible to the external party as an indicator that the user is disengaged from the virtual world and available for interaction in the real world. The image displayed to the external party may include, for example, a simple change in color of the external surface of the device, a message in the form of characters and/or icons, an image of a set of eyes to simulate the user returning a gaze to the external party, and the like.

Figure 7:
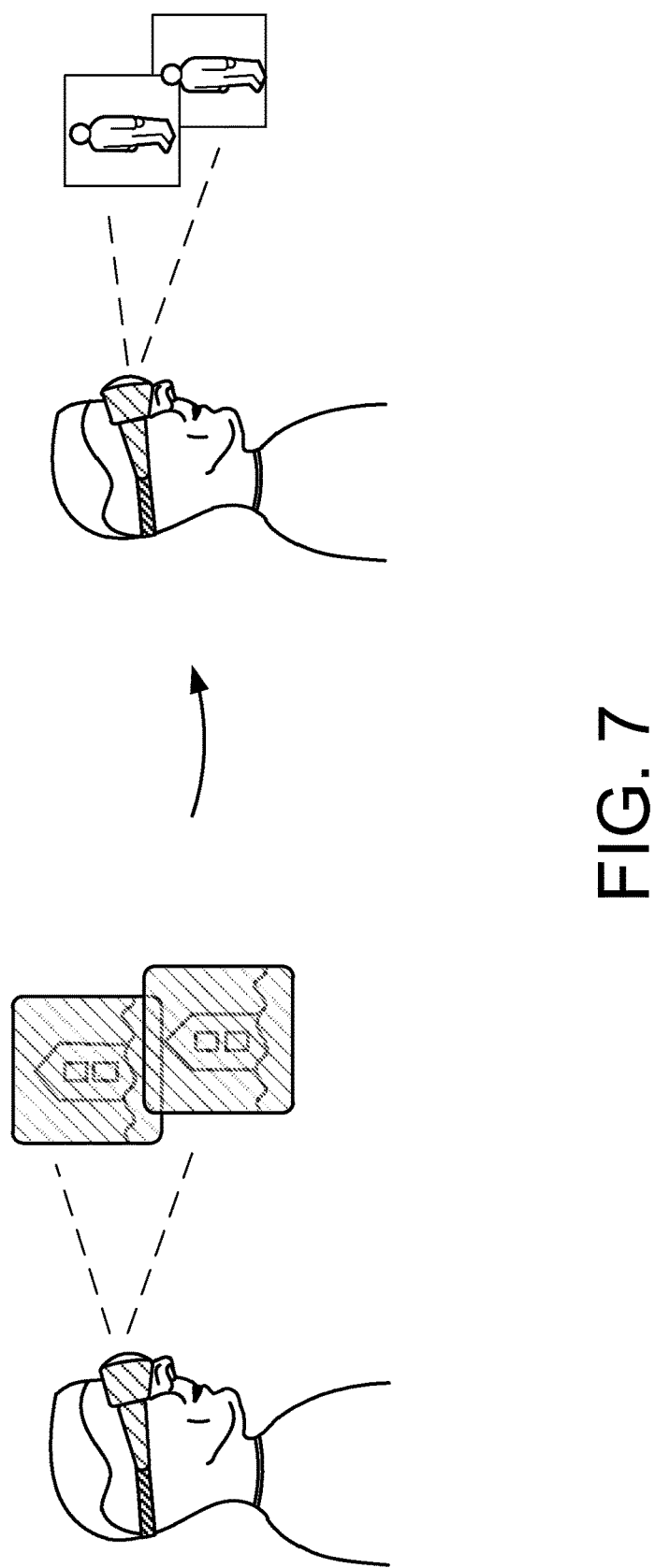
FIG. 7 illustrates a pass through mode of the example head mounted display shown in FIGS. 1A-1C, in accordance with an embodiment as broadly described herein.

In some embodiments, the transition in response to the request from the external party to gain the attention of the user may also include the display of pass through images to the user. These pass through images may be captured by the camera 180 and displayed on the display 140 of the HMD 100, as shown in FIG. 7.

Figure 8:
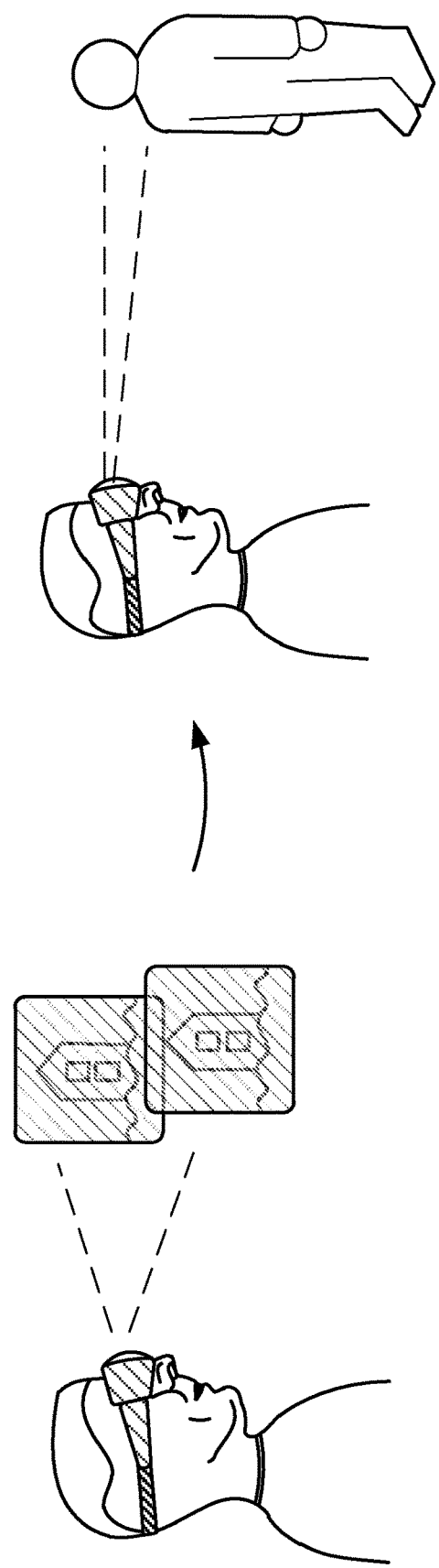
FIG. 8 illustrates a transparent mode of the example head mounted display shown in FIGS. 1A-1C, in accordance with an embodiment as broadly described herein.

In some embodiments, the display 140 may be a transparent display. In this case, in response to a request from an external party to gain the attention of the user, the control system 170 may initiate the transition out of the virtual world, and cause the display 140 to transition to the transparent state as the virtual world images fade or are otherwise no longer displayed, as shown in FIG. 8. In the transparent state, the user may view the external party directly through the display 140, and the user's eyes may be visible to the external party through the transparent display as shown, for example, in FIG. 6A, indicating that the user is disengaged from the virtual world and available for interaction in the real world.

Figure 9:
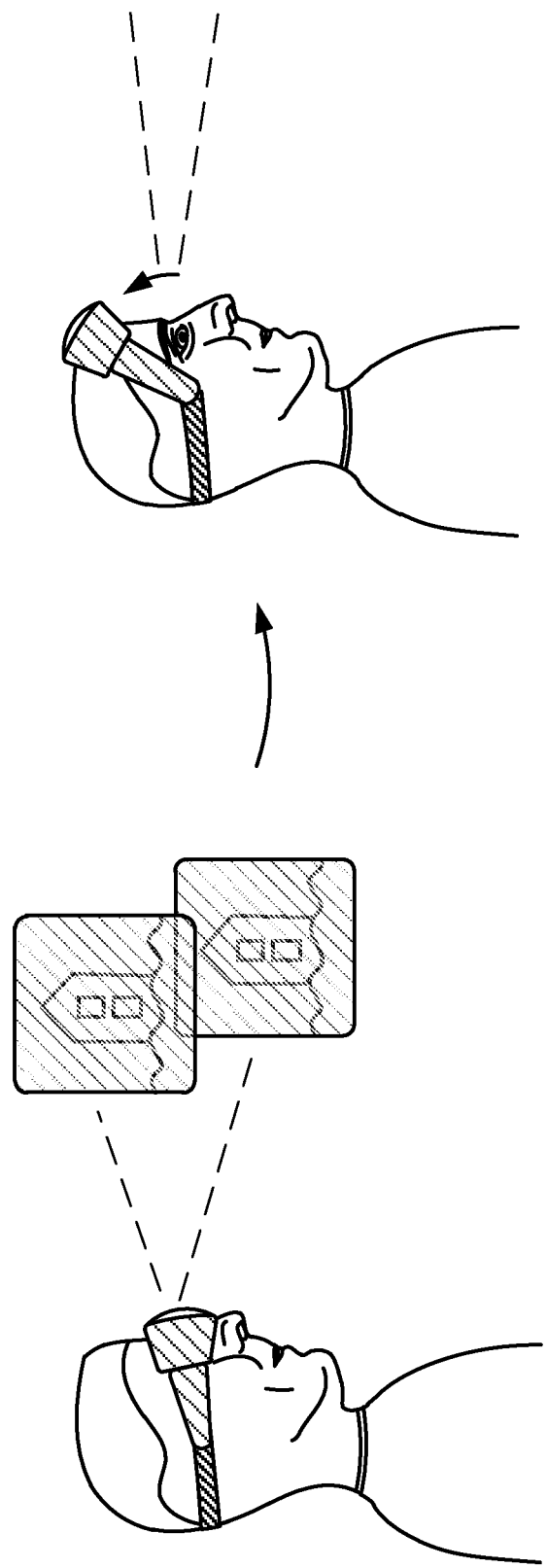
FIG. 9 illustrates a rotation of the example head mounted display shown in FIGS. 1A-1C, in accordance with an embodiment as broadly described herein.

In some embodiments, in response to a request from an external party to gain the attention of the user, the control system 170 may activate a transition control module 176 to initiate the transition out of the virtual world. Activation of the transition control module 176 may cause the housing 110 (and the optical components housed therein) to rotate with respect to the frame 120, as shown in FIG. 9, from the down/closed position to the open position, so that the housing 110 and optical components are out of the line of sight of the user, so that the user has an unobstructed view of the real world, and the user's eyes are visible to the external party.

As noted above, in some embodiments, the transition from the virtual world to the real world, or from the real world into the virtual world, may follow a particular profile based on, for example, a type of virtual immersive experience, a direction and/or speed of the user, user preferences, and other such factors. The transition may also take into account environmental factors such as, for example, a brightness level and a sound level in the real world space 300 compared to a brightness level and a sound level in the virtual immersive experience generated by the HMD 100. For example, in some embodiments, a brightness level in the space 300 may be sensed by a light sensor 162 of the sensing system 160, or by a light sensor included in the camera 180, and a sound level in the space 300 may be sensed by an audio sensor 164 of the sensing system 160, or by a microphone included in the camera 180. When transition is to be initiated, the brightness level and the sound level of the real world space 300 sensed by the sensing system may be compared to the brightness level and sound level of the virtual world by the processor 190, and the transition process, for example, the transition profile, may be selected/established taking into account the degree of difference between these environmental factors in the virtual world and the real world.

Figure 10:
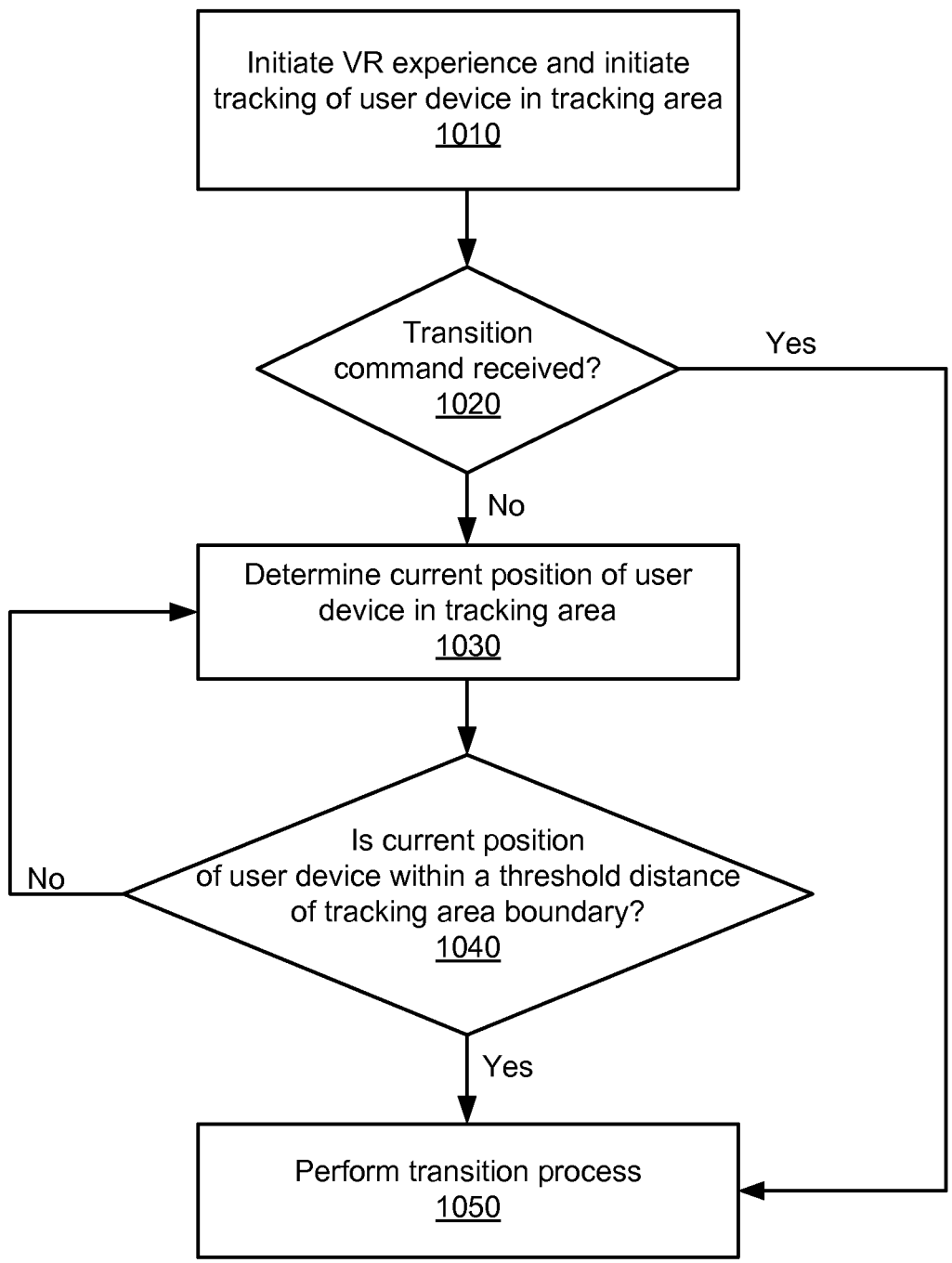
FIG. 10 is a flowchart of an example process of initiating a transition process, in accordance with embodiments as broadly described herein.

FIG. 10 is a flowchart of a process for initiating a transition between a virtual environment and an ambient environment, in accordance with embodiments as broadly described herein. As shown in FIG. 10, at block 1010 the user may activate the system, including the HMD 100, to allow the HMD 100 to generate the virtual immersive experience and the tracking device 310 to track the user in the space 300 as described in detail above. If, at some point during operation of the system, a transition command is received, as at block 1020, the transition process may be initiated at block 1050. As described in detail above, the transition command may be, for example, a direct request input by the user, for example via the control system 170 of the HMD 100 or other user gesture or keyword recognized by the HMD 100. In some embodiments, the transition command may be a gesture, or keyword, or other such input from an external party that is recognized by the HMD 100. In some embodiments, the transition command may be, for example, detection of an obstacle in the path of the user that triggers transition out of the virtual world, as described in detail above.

In the absence of a specific command to transition from the virtual world, the HMD 100 and/or the tracking device 310 may determine a current position of the user in the tracking area 320 at block 1030, as described above. If it is determined, at block 1040, that the user is within a set threshold or range of the boundary of the tracking area 320, at which loss of tracking by the tracking device 310 may be imminent, the transition process may be initiated at block 1050. The transition process is shown in more detail in FIG. 11.

Figure 11:
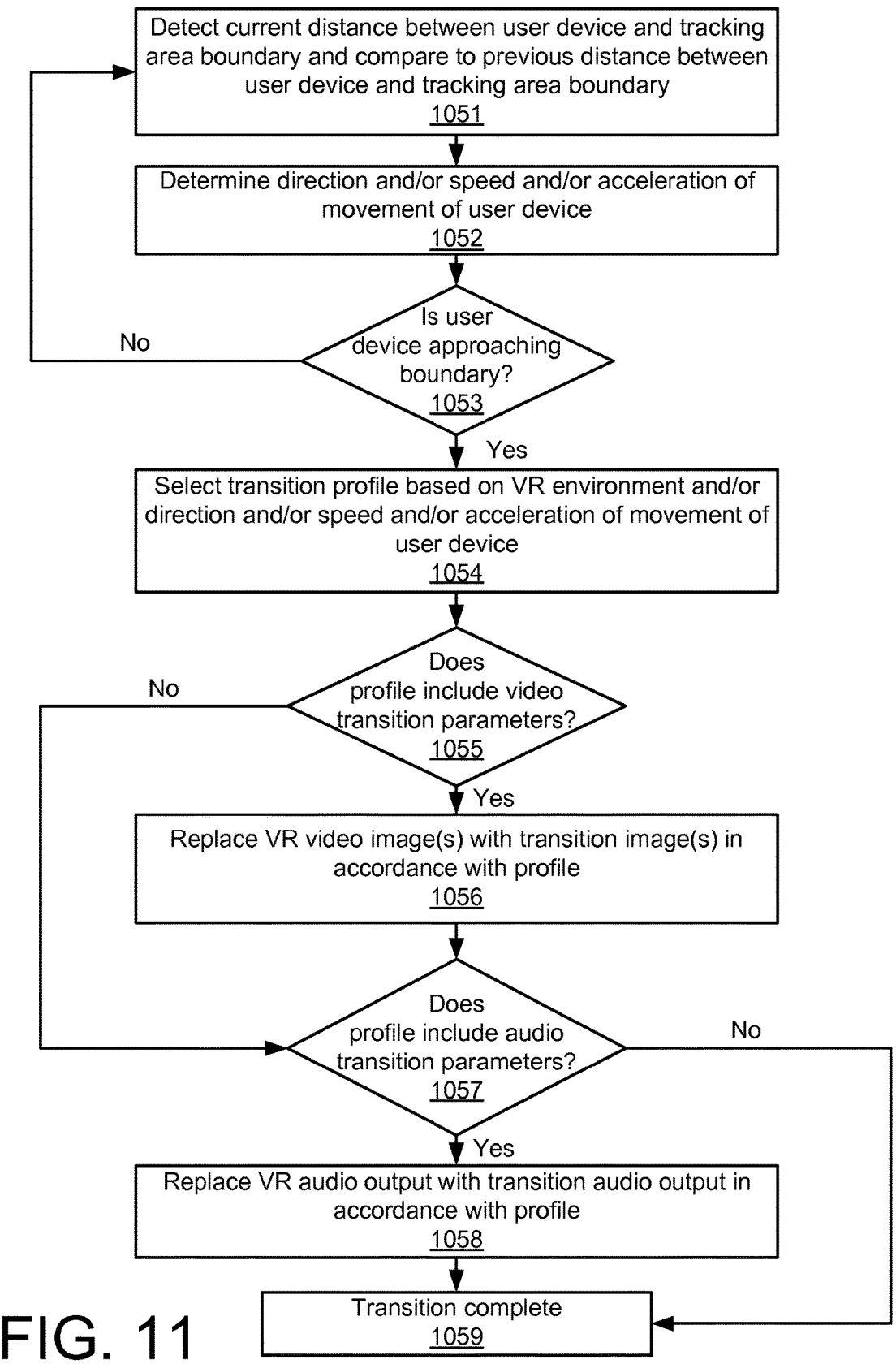
FIG. 11 is a flowchart of a transition process shown in FIG. 10, in accordance with embodiments as broadly described herein.

As shown in FIG. 11, a current distance between the user and the boundary of the tracking area 320 may be detected, and may be compared to a previously detected distance between the user and the boundary, at block 1051. Based on this comparison, a direction and/or speed and/or acceleration of the movement of the user may be determined, at block 1052, to confirm the user is approaching the boundary at block 1053. If it is confirmed at block 1053 that the user is approaching/nearing the boundary (and is about to enter an area where the tracking device 310 may not be able to continue to track the user's physical movement in the space 300), a transition profile may be implemented, at block 1054, based on various factors, such as, for example, the virtual environment, the real world space 300 in which the virtual environment is implemented, direction and/or speed and/or acceleration associated with the movement of the user, and other such factors.

If, at block 1055, it is determined that the transition profile includes video parameters, then, at block 1056, the virtual image(s) associated with the virtual world displayed on the display 140 of the HMD 100 may be replaced with transition image(s) displayed on the display 140 in accordance with the profile. As discussed above, this replacement of the virtual image(s) with transition image(s) may include, for example, a symmetric or asymmetric fade out of the virtual image(s) accompanied by a fade in of the transition image(s). The transition images may include, for example, a monochromatic display, a display of text and/or characters and/or icons, a ghost image of the real world superimposed on the virtual image, a pass through image, and the like, as discussed in detail above. This transition may also include a transparent display 140 transitioning to a transparent state so that the real world is visible to the user through the transparent display, or a movement of a portion of the HMD 100 out of the field of view of the user so that the real world is directly visible to the user.

If, at block 1057, it is determined that the transition profile includes audio parameters, then, at block 1058, the virtual audio output associated with the virtual world and output to the user via the audio output device 130 of the HMD 100 may be replaced with transition audio output in accordance with the profile. As discussed above, this replacement of the virtual audio output with transition audio output may include, for example, a serial fade out of the virtual audio followed by a fade in of the transition audio output. The transition audio output may include, for example, the actual sound generated in the real world space 300, a preset tone, no sound, and the like.

As noted above, environmental factors in the virtual world and in the real world may be taken into account in the transition process, so as to ease the transition between the virtual world and the real world, to enhance user comfort during transition. Once each of the different factors/parameters included in the implemented transition profile have been transitioned, the transition process may be completed at block 1059.

As noted above, after the transition process has been completed, the HMD 100 and/or the tracking device 310 may also detect when the user re-enters the tracking area 320 and may transition from the real world back into the virtual world. In some embodiments, this transition from the real world back into the virtual world may allow the user to re-enter the virtual world at a point at which the transition out of the virtual world was initiated, allowing the user to essentially pick up where he/she left off.

In a system and method, in accordance with embodiments as broadly described herein, a transition between the virtual world and the real world my be automatically carried out based on a user's position in a tracking area of a space in which a tracking device may track the user's physical movement in the space and translate that physical movement into corresponding movement in the virtual world. Automatically initiating this transition before tracking of the user's physical movement is lost may avoid the disorientation and discomfort associated with loss of tracking and corresponding loss of movement in the virtual world.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of operating a system configured to generate a virtual environment, the method comprising:
    activating a tracking device and tracking a position of a user electronic device in an ambient environment;
    detecting a transition condition, including
        detecting an external input and generating a transition command when the detected external input is recognized as a request from an external party to initiate a transition of the user electronic device between the virtual environment and the ambient environment, or
        comparing a distance between the user electronic device and at least one boundary of a tracking area tracked by the tracking device within the ambient environment and generating a transition command when the distance between the user electronic device and the at least one boundary of the tracking area is less than or equal to a preset threshold distance; and
    performing a transition process to transition between the virtual environment generated by the user electronic device and the ambient environment in response to the detected transition condition.

2. The method of claim 1, wherein an area of the ambient environment is greater than a tracking area of the tracking device, such that a system boundary corresponds to a boundary of the tracking area of the tracking device within the ambient environment, detecting a transition condition including:
    comparing a distance between the user electronic device and the boundary of the tracking area of the tracking device within the ambient environment; and
    generating the transition command to initiate the transition process when the distance between the user electronic device and the boundary of the tracking area is less than or equal to a preset threshold distance.

3. The method of claim 1, wherein an area of the ambient environment is less than a tracking area of the tracking device, such that a system boundary corresponds to a physical boundary of the ambient environment, detecting a transition condition including:
    comparing a distance between the user electronic device and the physical boundary of the ambient environment; and
    generating the transition command to initiate the transition process when the distance between the user electronic device and the physical boundary of the ambient environment is less than or equal to a preset threshold distance.

4. The method of claim 1,
    detecting an external input including detecting a physical gesture implemented by an external party, an audio command generated by an external party, an approach of an external party, or an eye gaze of an external party, and
    comparing a distance between the user electronic device and at least one boundary of a tracking area tracked by the tracking device including determining at least one of a direction, a speed, or an acceleration of movement of the user electronic device based on a comparison of a current position to at least one previous position of the electronic device detected by the tracking device, and
    performing a transition process including:
        replacing virtual image output displayed on a display of the user electronic device in the virtual environment with transition image output displayed on the display, the transition image output including at least one of a monochromatic display, a pass through image of the ambient environment captured by a camera of the user electronic device, or a fading out of the virtual image output of the virtual environment and a fading in of the transition image output, or
        replacing virtual audio output generated by the user electronic device in the virtual environment with transition audio output, the transition audio output including at least one of a preset signal or tone or a pass through of ambient sound captured by a microphone of the user electronic device, or a fading out of the audio output of the virtual environment and a fading in of transition audio output, or
        generating at least one of an externally directed visual indicator, an externally directed audible indicator, or an externally directed physical indicator indicating to an external party that the transition process is complete.

5. The method of claim 1, comparing a distance between the user electronic device and at least one boundary of a tracking area tracked by the tracking device also including:
    comparing a current position of the user electronic device detected by the tracking device to at least one previous position of the user electronic device detected by the tracking device; and
    determining at least one of a direction of movement of the user electronic device, a speed of movement of the user electronic device, or an acceleration of movement of the user electronic device based on the comparison of the current position to the at least one previous position.

6. The method of claim 5, performing a transition process to transition between the virtual environment generated by the user electronic device and the ambient environment including:
    selecting a transition profile based on at least one of the determined direction, speed or acceleration of movement of the user electronic device, environmental parameters of the virtual environment generated by the user electronic device, or preset user preferences.

7. The method of claim 1, wherein performing a transition process includes:
    initiating the transition process in response to the transition command and performing the transition process such that the transition between the virtual environment and the ambient environment is complete at or before the user electronic device reaches the at least one boundary of the tracking area.

8. The method of claim 7, performing the transition process also including:

detecting that the user electronic device has crossed the at least one boundary and is outside of the tracking area of the tracking device;

detecting that the user electronic device has moved from the outside of the tracking area and across the at least one boundary of the tracking area and has re-entered the tracking area; and transitioning back into the virtual environment when the tracking device detects that the user electronic device has re-entered the tracking area.

9. The method of claim 1, detecting a transition condition including:

detecting physical obstacle in a movement path of the user electronic device in the ambient environment, within a tracking area of the tracking device within the ambient environment;

comparing a distance between the user electronic device and the detected obstacle; and generating a transition command to initiate the transition process when the distance between the user electronic device and the detected obstacle is less than or equal to a preset threshold distance.

10. The method of claim 9, detecting a physical obstacle in a movement path of the user electronic device in the ambient environment, within a tracking area of the tracking device within the ambient environment including:

intermittently scanning the tracking area and capturing an image of the tracking area;

comparing a current image of the tracking area to at least one previous image of the tracking area captured by the tracking device; and detecting the physical obstacle in the movement path of the user electronic device in the ambient environment based on at least one change detected when comparing the current image of the tracking area to the at least one previous image of the tracking area.

11. The method of claim 1, detecting an external input including at least one of:

detecting a physical gesture implemented by an external party, detecting an audio command generated by an external party, detecting an approach of an external party, or detecting an eye gaze of an external party; and wherein performing the transition process includes generating at least one of a visual indicator, an audible indicator, or a physical indicator directed to the external party indicating completion of the transition process.

12. The method of claim 11, detecting an audio command corresponding to an externally generated transition command including at least one of detecting a voice command including at least one previously set keyword, or detecting an audio tone, corresponding to the externally generated transition command.

13. The method of claim 1, performing a transition process including transitioning from the virtual environment to the ambient environment, including at least one of:

fading out a virtual image output of the virtual environment displayed on a display of the user electronic device and fading in a transition image output displayed on the display of the user electronic device; or fading out of audio output of the virtual environment output by the user electronic device and fading in of transition audio output by the user electronic device.

14. The method of claim 13, wherein fading out a virtual image output and fading in a transition image output includes replacing a virtual video output of the virtual world displayed on the display with a monochromatic display.

15. The method of claim 13, fading out a virtual image output and fading in a transition image output including replacing a virtual video output of the virtual world displayed on the display with a pass through image of the ambient environment captured by an imaging device of the user electronic device.

16. The method of claim 13, fading out a virtual image output and fading in a transition image output including:

transitioning the display from a non-transparent state to a transparent state while fading out the virtual image output displayed on the display such that the ambient environment is visible through the display upon completion of the fade out of the virtual image output.

17. An audio visual system, comprising:

a user electronic device generating a virtual environment, the user electronic device operating in and being movable within an ambient environment;

a tracking device in communication with the user electronic device, the tracking device tracking a position and movement of the user electronic device in the ambient environment; and a processor configured to:

translate the detected movement of the user electronic device in the ambient environment into virtual movement in the virtual environment generated by the user electronic device;

detect a transition condition, including detect an external input recognized as a request from an external party for transition of the user electronic device between the virtual environment and the ambient environment, or compare a distance between the user electronic device and at least one boundary of a tracking area tracked by the tracking device within the ambient environment and generate a transition command when the distance between the user electronic device and the at least one boundary of the tracking area is less than or equal to a preset threshold distance; and perform a transition between the virtual environment generated by the user electronic device and the ambient environment in response to the detected transition condition.

18. The system of claim 17, wherein the processor is further configured to:

transition out of the virtual environment generated by the user electronic device based on transition parameters included in a transition profile corresponding to the detected transition condition, including at least one of:

replacing virtual image output displayed on a display of the user electronic device in the virtual environment with transition image output displayed on the display based on the transition parameters included in the transition profile, the transition image output including at least one of a monochromatic display or a pass through image of the ambient environment captured by a camera of the user electronic device, replacing virtual audio output generated by the user electronic device in the virtual environment with transition audio output, the transition audio output including at least one of a preset signal or tone or a pass through of ambient sound captured by a microphone of the user electronic device, or generating at least one of an externally directed visual indicator, an externally directed audible indicator, or an externally directed physical indicator indicating to an external party that the transition process is complete.

19. The system of claim 17, the external input including at least one of a physical gesture implemented by an external party, an audio command generated by an external party, an approach of an external party, or an eye gaze of an external party.

20. The system of claim 17, wherein the processor is further configured to:
   perform a transition from the virtual environment generated by the user electronic device to the ambient environment such that the transition out of the virtual environment is complete at or before the user electronic device reaches the boundary; and
   perform a second transition from the ambient environment into the virtual environment when the tracking device detects that the user electronic device has crossed the boundary and has re-entered the tracking area.

21. A method, comprising:
   generating, by an electronic device, a virtual environment, the electronic device operating in an ambient environment;
   tracking, by a tracking device, a position of the electronic device in the ambient environment;
   detecting a transition condition, including:
      detecting an external input and recognizing the detected external input as a request from an external party to initiate a transition, or
      detecting a distance between the electronic device and at least one boundary of a tracking area tracked by the tracking device that is less than or equal to a previously set threshold distance, including determining at least one of a direction, a speed, or an acceleration of movement of the electronic device based on a comparison of a current position to at least one previous position of the electronic device detected by the tracking device; and
   performing a transition process to transition between the virtual environment generated by the electronic device and the ambient environment in response to the detected transition condition, including:
      replacing virtual image output displayed on a display of the user electronic device in the virtual environment with transition image output displayed on the display, the transition image output including at least one of a monochromatic display, a pass through image of the ambient environment captured by a camera of the electronic device, or a fading out of the virtual image output of the virtual environment and a fading in of the transition image output, or
      replacing virtual audio output generated by the electronic device in the virtual environment with transition audio output, the transition audio output including at least one of a preset signal or tone or a pass through of ambient sound captured by a microphone of the electronic device, or a fading out of the audio output of the virtual environment and a fading in of transition audio output, or
      generating at least one of an externally directed visual indicator, an externally directed audible indicator, or an externally directed physical indicator indicating to an external party that the transition process is complete.

* * * * *